(12) United States Patent
Massey, Jr.

(10) Patent No.: US 8,576,828 B1
(45) Date of Patent: Nov. 5, 2013

(54) MOBILE DEVICE SILENT/VIBRATE OVERRIDE FOR SELECTED CALLING TELEPHONE NUMBER AND EMAIL/TEXT ORIGINATIONS

(75) Inventor: Joseph T. Massey, Jr., Atlanta, GA (US)

(73) Assignee: Joseph T. Massey, Jr., Atlanta, GA (US)

( * ) Notice: Subject to any disclaimer, the term of this patent is extended or adjusted under 35 U.S.C. 154(b) by 333 days.

(21) Appl. No.: 13/210,079

(22) Filed: Aug. 15, 2011

Related U.S. Application Data

(60) Provisional application No. 61/374,907, filed on Aug. 18, 2010.

(51) Int. Cl.
*H04J 3/24* (2006.01)
*H04J 3/22* (2006.01)
*H04M 3/00* (2006.01)

(52) U.S. Cl.
USPC ............ 370/349; 370/471; 455/419; 455/420

(58) Field of Classification Search
USPC ......................................................... 370/349
See application file for complete search history.

*Primary Examiner* — Huy C Ho
(74) *Attorney, Agent, or Firm* — Alston & Bird LLP

(57) ABSTRACT

Various embodiments of the present invention overcomes deficiencies in the art by providing an apparatus (e.g., a mobile device) and executable code for use on an apparatus that provide the ability to designate selected incoming message sources, such as calling telephone numbers or email/text sender addresses, with an override flag, which can also be used, if desired, with a time-of-day parameter setting. With this feature, the user can place the apparatus in a particular alert mode and designate which calling telephone numbers or email/text sender addresses will override the alert mode with a second alert mode that is more appropriate for alerting the user when an incoming message is received from one of the designated calling telephone numbers or email/text sender addresses.

27 Claims, 4 Drawing Sheets

Figure 1:
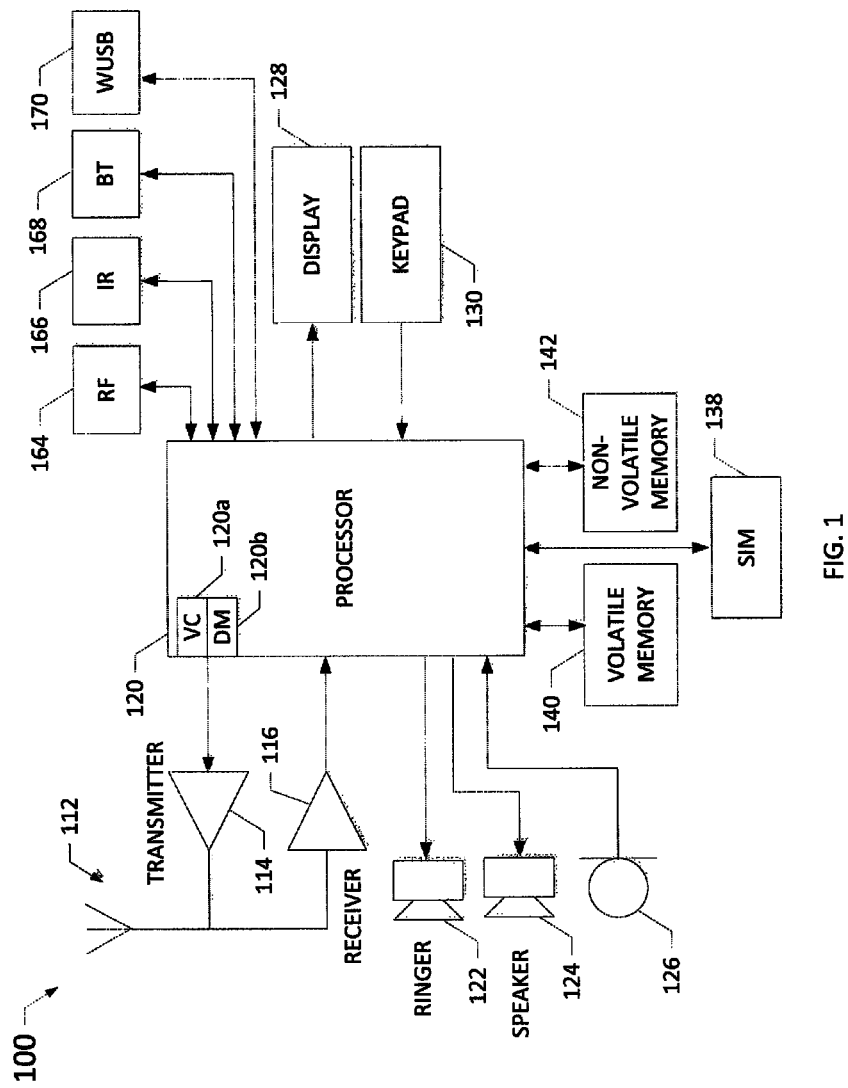

MOBILE DEVICE SILENT/VIBRATE OVERRIDE FOR SELECTED CALLING TELEPHONE NUMBER AND EMAIL/TEXT ORIGINATIONS

CROSS-REFERENCE TO RELATED APPLICATIONS

This application claims the benefit of U.S. Provisional Application No. 61/374,907, filed Aug. 18, 2010, which is incorporated herein by reference in its entirety.

BACKGROUND OF THE INVENTION

Currently, mobile devices support the ability to administer a variety of tones and signals (including vibrate) for various message types. However, if the device is placed into silent mode or vibrate mode, the previously administered audible tones/signals are suppressed and the device either vibrates (vibrate mode) or does not alert at all (silent mode). The deficiency of this design is that users who would like to receive alerts for urgent or emergency messages (e.g., phone calls, text messages, and/or emails) but suppress the altering for all other messages are forced to either leave the phone in normal mode when sleeping or risk not detecting the vibration when in other environments, e.g. meeting, entertainment performance, etc. Thus, a need exists in the arts to provide functionality on a mobile device that provides capability to override the alert modes (e.g., the silent/vibrate mode) in instances when an urgent or emergency message is received.

BRIEF SUMMARY OF THE INVENTION

Various embodiments of the present invention provide apparatuses, methods, and computer-program products containing executable code for receiving incoming messages. In various embodiments, the apparatus is a mobile device. The mobile device may be one of several types of electronic devices such as mobile telephones, mobile computers, portable digital assistants (PDAs), laptop computers, gaming devices, electronic tablets, and other types of similar electronic devices In particular embodiments, executable code is provided that can be installed on an apparatus so that the code may be executed by at least one processor of the apparatus to cause the apparatus to perform certain functionality. For instance, in various embodiments, the executable code may be downloaded from a remote location onto the apparatus and installed or may be provide on some type of non-transitory medium.

Thus, in various embodiments, an incoming message is received and a determination is made as to whether an override flag has been set for a message source that has sent the incoming message. For instance, in particular embodiments, the incoming message is one of a phone call, a text message, or an electronic mail and the message source is one of a phone number, an electronic mail address, or a text message address.

In particular embodiments, a further determination is made as to whether the incoming message has been received within a window comprising a start period of time and an end period of time and/or whether a particular alert mode is currently applicable that is used to alert an individual of one or more incoming messages received from one or more types of message sources. In addition, in particular embodiments, the particular alert mode is overridden to a second alert mode in order to facilitate alerting the individual of the incoming message. In these particular embodiments, the particular alert mode may be overridden in response to one or more of (1) the override flag being set for the message source, (2) the incoming message being received within the window, and (3) the particular alert mode being currently applicable.

In particular embodiments, the particular alert mode may comprise a silent or vibrate mode and the second alert mode may comprise a ringtone mode. In other embodiments, the particular alert mode may comprise a ringtone mode at a first particular volume and the second alert mode may comprise the ringtone mode at a second particular volume different than the first particular volume. While in other embodiments, the particular alert mode may comprise a first ringtone mode at a first particular volume and the second alert mode may comprise a second ringtone mode at a second particular volume.

Further, in particular embodiments, the message source may be associated with a particular contact listed in contract information, and a user may set the override flag for the particular contact or for the message source for the particular contact in the contact information. In addition, in particular embodiments, the user may also set the window for the particular contact or for the message source for the particular contact in the contact information. Finally, in various embodiments, a recurrence designation can be set for an application of the window, the recurrence designation comprising once, one or more particular days, weekly on one or more particular days, and at all times.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a schematic diagram of a mobile device according to one embodiment of the present invention.

Figure 2:
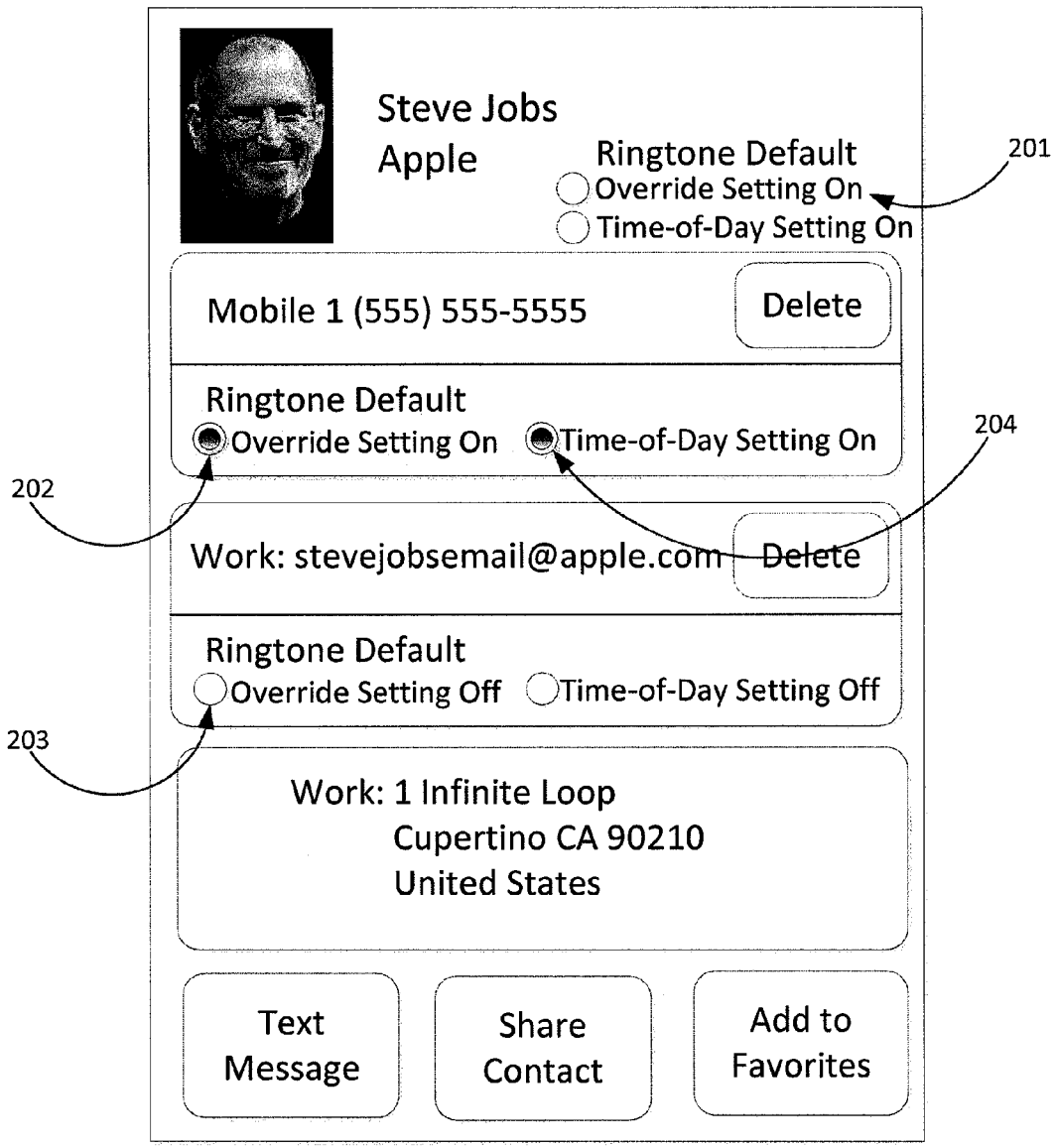

FIG. 2 provides a mobile device contact screen displaying a setting menu providing the capability to activate an "Override Setting" and/or a "Time-of-Day Setting" according to an embodiment of the present invention.

Figure 3:
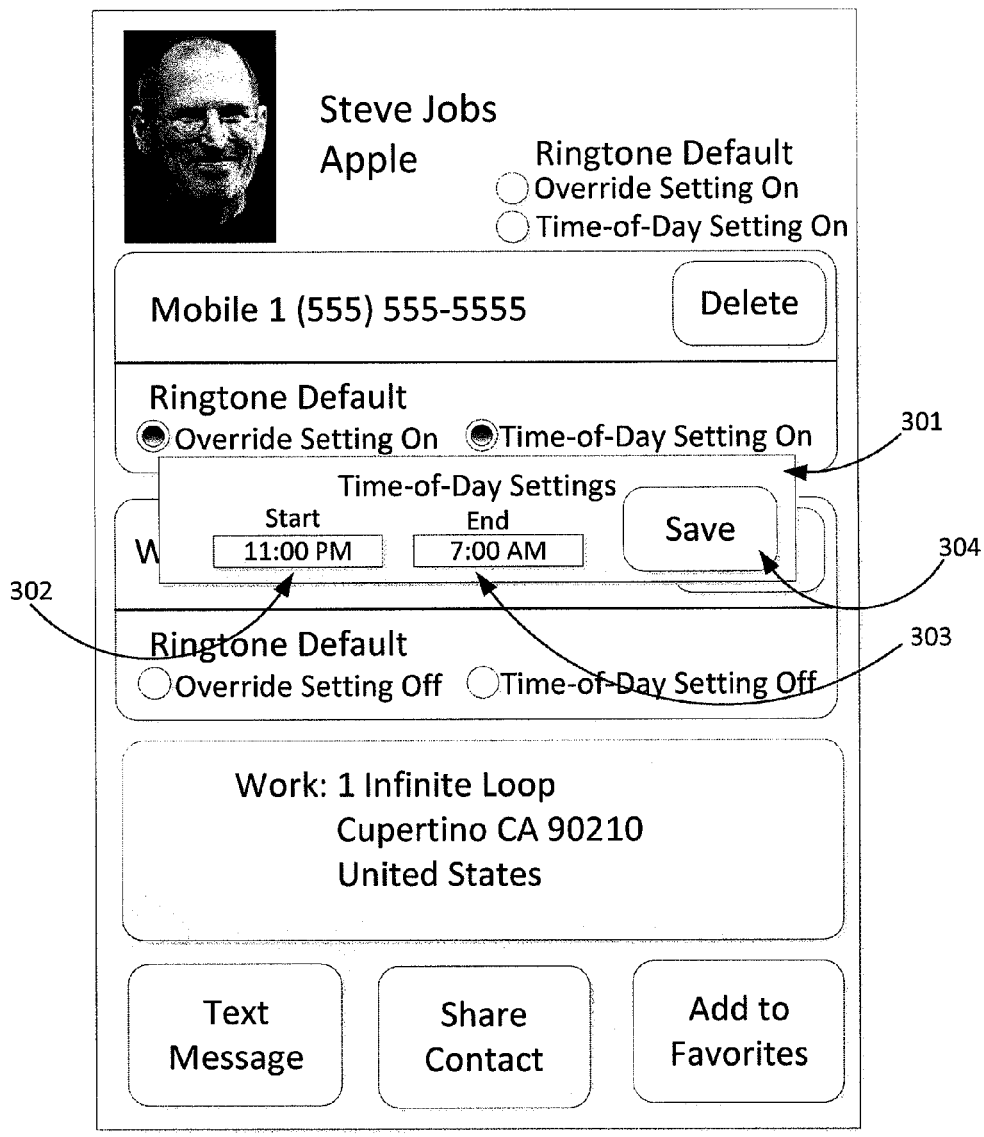

FIG. 3 provides a mobile device contact screen displaying a setting menu providing the capability to activate the start and end times for a "Time-of-Day Setting" according to an embodiment of the present invention.

Figure 4:
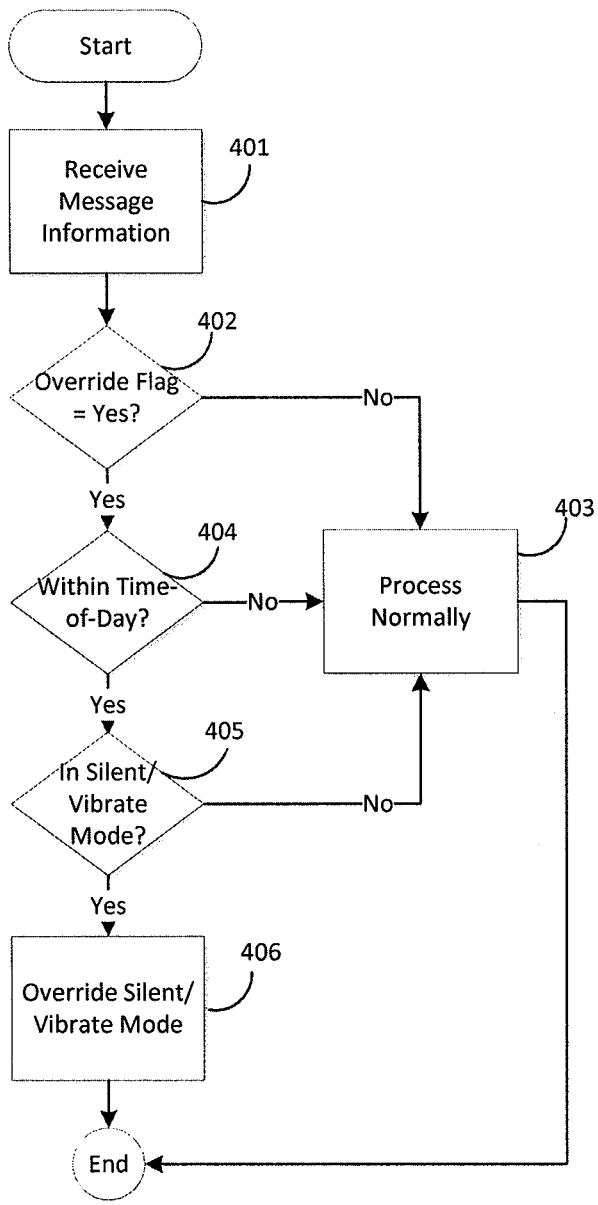

FIG. 4 provides a flow diagram of functionality performed by an override mode application according to one embodiment of the invention.

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary Mobile Device

FIG. 1 provides a schematic diagram of a mobile device 100 according to one embodiment of the present invention. In this particular instance, the mobile device 100 is a smartphone. However, it should be understood that the mobile device 100 illustrated and hereinafter described is merely illustrative of one type of device that may implement and/or benefit from various embodiments and, therefore, should not be taken to limit the scope of the invention. Thus, it should be noted that other types of electronic devices, such as mobile telephones, mobile computers, portable digital assistants (PDAs), laptop computers, gaming devices, electronic tablets, and other types of similar electronic devices, may employ various embodiments of the invention.

As shown, the mobile device 100 may include an antenna 112 (or multiple antennas 112) in communication with a transmitter 114 and a receiver 116. The mobile device 100 may also include a processor 120 (e.g., application processor and/or graphics processor) configured to provide signals to and receive signals from the transmitter 114 and receiver 116, respectively.

The processor 120 may, for example, be embodied as various configurations including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 220 comprises a plurality of processors.

The signals sent and received by the processor 120 may include signaling information in accordance with an air interface standard of an applicable cellular system, and/or any number of different wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like.

In this regard, the mobile device 100 may be capable of operating with one or more air interface standards, communication protocols, modulation types, access types, and/or the like. More particularly, the mobile device 100 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile device 100 may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile device 100 may be capable of operating in accordance with 2.5G wireless communication protocols General Packet Radio Service (GPRS), Enhanced Data GSM Environment (EDGE), and/or the like. Further, for example, the mobile device 100 may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile device 100 may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile device 100 may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile devices 100 may also benefit from embodiments of this invention, as should dual or higher mode phones (for example, digital/analog or TDMA/CDMA/analog phones). Additionally, the mobile device 100 may be capable of operating according to Wi-Fi or Worldwide Interoperability for Microwave Access (WiMAX) protocols.

It is understood that the processor 120 may comprise circuitry for implementing audio/video and logic functions of the mobile device 100. For example, the processor 120 may comprise a digital signal processor device, a microprocessor device, an analog-to-digital converter, a digital-to-analog converter, and/or the like. Control and signal processing functions of the mobile device 100 may be allocated between these devices according to their respective capabilities. Additionally, the processor 120 may comprise an internal voice coder (VC) 120*a*, an internal data modem (DM) 120*b*, and/or the like. Further, the processor 120 may comprise functionality to operate one or more software programs, which may be stored in memory. For example, the processor 120 may be capable of operating a connectivity program, such as a web browser. The connectivity program may allow the mobile device 100 to transmit and receive web content, such as location-based content, according to a protocol, such as Wireless Application Protocol (WAP), hypertext transfer protocol (HTTP), and/or the like. The mobile device 100 may be capable of using a Transmission Control Protocol/Internet Protocol (TCP/IP) to transmit and receive web content across the internet or other networks.

The mobile device 100 may also comprise a user interface including, for example, an earphone or speaker 124, a ringer 122, a microphone 126, a display 128, a user input interface, and/or the like, which may be operationally coupled to the processor 120. In this regard, the processor 120 may comprise user interface circuitry configured to control at least some functions of one or more elements of the user interface, such as, for example, the speaker 124, the ringer 122, the microphone 126, the display 128, and/or the like. The processor 120 and/or user interface circuitry comprising the processor 120 may be configured to control one or more functions of one or more elements of the user interface through computer program instructions (for example, software and/or firmware) stored on memory accessible to the processor 120 (for example, volatile memory 140, non-volatile memory 142, and/or the like). Although not shown, the mobile device 100 may comprise a battery for powering various circuits related to the mobile device 100, for example, a circuit to provide mechanical vibration as a detectable output. The user input interface may comprise devices allowing the mobile device 100 to receive data, such as a keypad 130, a touch display (not shown), a joystick (not shown), and/or other input device. In embodiments including a keypad, the keypad may comprise numeric (0-9) and related keys (#, *), and/or other keys for operating the mobile device 100.

As shown in FIG. 1, the mobile device 100 may also include one or more components for sharing and/or obtaining data. For example, the mobile device 100 may comprise a short-range radio frequency (RF) transceiver and/or interrogator 164 so data may be shared with and/or obtained from electronic devices in accordance with RF techniques. The mobile device 100 may comprise other short-range transceivers, such as, for example, an infrared (IR) transceiver 166, a Bluetooth™ (BT) transceiver 168 operating using Bluetooth™ brand wireless technology developed by the Bluetooth™ Special Interest Group, a wireless universal serial bus (USB) transceiver 170 and/or the like. The Bluetooth™ transceiver 168 may be capable of operating according to low power or ultra-low power Bluetooth™ technology (for example, Wibree™) radio standards. In this regard, the mobile device 100 and, in particular, the short-range transceiver may be capable of transmitting data to and/or receiving data from electronic devices within a proximity of the mobile device 100, such as within 10 meters, for example. Although not shown, the mobile device 100 may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile device 100 may comprise memory, such as a subscriber identity module (SIM) 138, a removable user identity module (R-UIM), and/or the like, which may store information elements related to a mobile subscriber. In addition to the SIM, the mobile device 100 may comprise other removable and/or fixed memory. The mobile device 100 may include volatile memory 140 and/or non-volatile memory 142. For example, volatile memory 140 may include Random Access Memory (RAM) including dynamic and/or static RAM, on-chip or off-chip cache memory, and/or the like. Non-volatile memory 142, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 140, non-volatile memory 142 may include a cache area for temporary storage of data. The memories may store one or more applications (e.g., software programs), instructions, pieces of information, data, and/or the like which may be used by the mobile device 100 for performing functions of the mobile device 100. For instance, as described in greater detail below, one or more of the memories on the device 100 may store an override mode application in various embodiments that performs various aspects of the claimed invention.

III. General Overview of the Process a. General Application

Various embodiments of the present invention overcome deficiencies in the art by providing a mobile device 100 and method for using same which applies to a mobile device 100 that provides a user of the device 100 the ability to designate select incoming message sources such as calling telephone numbers, email addresses, and text messages with an override-flag so that when a message is received from one of these sources, the current alert mode is overridden with a more appropriate mode for alerting the user of the incoming message being received. For instance, with this feature, the user can place the mobile device 100 in silent/vibrate mode in particular embodiments and designate which calling telephone numbers or email/text sender addresses will override the silent/vibrate mode and alert the user.

In various embodiments, such capability on the device 100 may be provided through various mechanisms. For instance, in particular embodiments, the mobile device 100 may be provided to the user with the functionality already implemented on the device. For example, in these particular embodiments, the mobile device 100 may be configured either through software and/or hardware components during manufacturing of the device 100 that provide the various functionality of the present invention. However, in other embodiments, the user may install either software and/or hardware components on the device 100 to implement the various functionality of the present invention. For example, in various embodiments, the user of the device 100 may visit an application store (e.g., website) for his or her cellular and/or device provider using a web browser or other application on the device 100 and may download and install an application (e.g., software) on the device 100 that implements the various functionality of the present invention.

In particular embodiments, the device 100 uses an override flag to override the current alert mode (e.g., the silent/vibrate mode) previously administered by the device user. Such functionality causes the device 100 to alert the user of an incoming message (e.g., phone call, text message, and/or email) in a more appropriate fashion such as an alert mode previously designated for the normal mode (e.g., non-silent/vibrate mode) of operation for the type of message source. In addition, in particular embodiments, a time-of-day parameter may also be set by the user to cause the override flag to be ignored if the message is not received during a designated time window. With such functionality in place on the device 100, the user can place the phone in silent/vibrate mode and designate which calling telephone numbers and/or email/text sender addresses override the silent/vibrate mode and alert the user.

A typical example of the use of such functionality would be for a user to designate a family member's telephone number as having override capability on his device 100, set the device 100 to silent/vibrate mode with the time-of-day parameter defined as 11 p.m. to 7 a.m., and retire for the night. As a result, in various embodiments, messages other than from the designated family member sent to the device 100 would not cause the device 100 to override the silent/vibrate mode. However, a call from the designated family member would cause the device 100 to override the silent/vibrate mode with the normal mode (e.g., loud ringtone mode) to wake the user, and allow the user to respond to the incoming message.

b. Override Flag Particulars

Given that mobile device native designs and features vary by manufacturer and model, in various embodiments, the override flag functionality applies to those designs where contact administration is supported. In general, on mobile devices 100, contact administration includes of a list of names with associated message-source entries for different types of communication such as an email address, an instant messaging address, and telephone numbers for business, home, and mobile device 100.

In various embodiments, the override flag functionality supports the ability to designate either a contact entry (e.g., the user's spouse) and/or a selected message-source entry (e.g., mobile device telephone number) as having the override-flag set. The method for setting the flag may vary according to different embodiments. For instance, in particular embodiments, the method for setting the override flag for a particular contact entry and/or message-source entry may depend on the device's native design. Thus, in various embodiments, the method for setting the override flag includes an additional field (e.g., check box) for the override flag that is assigned to each contact in the user's contacts administration listing found on the user's device 100 and/or an additional field (e.g., check box) for the override flag is assigned to each message source entry available for each contact in the user's contacts administration listing found on the user's device 100. Thus, in these particular embodiments, if the user wishes to set the override flag for every message source entry for a particular contact, the user may simply select the additional field (e.g., check the check box) associated with the particular contact. However, if the user wishes to only set the override flag for particular messages source entries for the contact (e.g., the contact's mobile device telephone number), the user may simply select the additional fields (e.g., check the check boxes) associated with the particular message source entries for the contact. As a result, when a message is received, the source of the message is checked based on the message source entities and corresponding contacts in the contacts administration listing found on the device 100 to determine whether the override flag applies to the message.

FIG. 2 provides an example of a contact from a contacts administration listing found on a mobile device 100 such as an iPhone®. As shown in FIG. 2, the contact has functionality to allow the user to set the override flag for the contact 201 and/or for particular message source entries for the contact 202, 203. In this particular instance, the user has set the override flag for the contact's mobile device by clicking the selection button 202 for the particular message source entry. In addition, the user has set the time-of-day setting by clicking the selection button 204 for the time-of-day setting for the particular message source entry.

In particular embodiments, a sub-screen may be provided so that the user may enter the starting and ending times for the time-of-day setting such as the screen 301 shown in FIG. 3. As shown in this figure, the user may set a start time 302 and end time 303, and may select the "Save" button 304 to save the settings.

As a result, the override flag is only enforced between the hours of 11:00 p.m. and 7:00 a.m. Thus, if the device 100 has been set to silent/vibrate mode, and a message is received from a message-source with the override-flag set, and the current device time is within the administered time-of-day window (e.g., between 11:00 p.m. and 7:00 a.m.), the override functionality will operate. Otherwise, if the message is received outside of the time-of-day window, the override functionality will operate as though the override flag had not been set. It should be noted that in various embodiments, the time-of-day window may also support a recurrence designation including but not limited to once, one or more particular days, weekly on one or more particular days, and at all times (24×7).

IV. Override Mode Application

As previously discussed, in various embodiments, the mobile device 100 may include an override mode application configured to perform various functionality of the claimed invention. FIG. 4 illustrates a flow diagram of the functionality of the override mode application for determining whether the override flag applies to a particular incoming message according to a particular embodiment. This flow diagram may correspond to the steps carried out by the processor 120 of the mobile device 100 shown in FIG. 1 as the processor 120 executes the application according to various embodiments.

In particular embodiments, the process starts with the user's mobile device 100 receiving an incoming message. For example, in a particular instance, a user of a mobile device 100 sets the device 100 to the silent/vibrate mode before retiring to bed in the evening. During the evening after going to bed, the user's mobile device 100 receives an incoming call at 3:00 a.m. from the user's spouse, who is on a business trip in Europe. In this particular example, the user and the user's spouse live in Chicago and the spouse is placing the phone call using her cell phone. In response, the mobile device 100 invokes the override mode application and forwards one or more pieces of information about the incoming call to the application. For example, the mobile device 100 forwards the incoming phone number to the override mode application.

Thus, in Step 401, the override mode application receives the incoming phone number. In Step 402, the override mode application queries the contacts administration listing found on the device 100 to determine whether the override flag has been turned on for the particular contact (e.g., the user's spouse) and/or message source for the contact (e.g., the spouse's cell phone). In this particular instance, the user has turned on the override flag for the cell phone number in the contact information for his spouse so that he will be alerted when an incoming call is received from his spouse. Therefore, in the example, the override mode application determines the override flag has been turned on for the particular incoming phone call currently being received.

In contrast, had the incoming message been an email received from the user's spouse instead of a phone call, the override mode application would have determined that override flag had not been turned on for this particular message source. As a result, the override mode application would have processed the message normally, shown as Step 403. That is, in this instance, the override mode application would not override the silent/vibrate mode of the device in order to alert the user of the incoming email.

In Step 404, the override mode application determines whether the user has set the time-of-day parameter for the particular contact and/or message source and if so, whether the incoming message is being received within the time-of-day window. In this particular instance, since the user's spouse is currently in Europe and the user expects to receive phone calls from her during the evening when he is typically asleep, the user has set the time-of-day parameter to a window of 11:00 p.m. to 7:00 a.m. Since the incoming phone call from the spouse is being received at 3:00 a.m., the override mode application determines the incoming message is within the time-of-day window. Similar to the override flag, had the incoming message not been received within the time-of-day window, the override mode application would have processed the incoming message normally, shown as Step 403.

Next, the override mode application determines whether the mobile device 100 is in silent/vibrate mode, shown as Step 405. If so, the override mode application overrides the silent/vibrate mode and sets the device 100 to some other type of mode that may be more likely to alert the user of the incoming message. If the device 100 is not in silent/vibrate mode, the override mode application processes the incoming message normally, shown as Step 403.

Thus, returning to the example, since the user had placed the device 100 in the silent/vibrate mode before going to bed, the override mode application determines the device 100 is in the silent/vibrate mode. As a result, the override mode application overrides the silent/vibrate mode and sets the mode to a more appropriate setting to alert the user, shown as Step 406. For instance, in one particular embodiment, the override mode application sets the device 100 to the default mode for the device 100. The default mode may be a ringtone at a particular volume. In another embodiment, the user may be able to set what the override mode is for the device 100. For example, the user may set the override mode to a particular ringtone at a particular volume level. Therefore, in this particular embodiment, the override mode application overrides the silent/vibrate mode and sets the device 100 to the override mode. Thus, as a result, the device 100 alerts the user of his spouse's incoming call from Europe so that the user may wake up and take the call.

V. Conclusion

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

Finally, it should be noted that the disclosure for the above-described invention is focused on overriding the silent and/or vibrate modes set for a mobile device 100 to a more appropriate mode so that the user of the device 100 may be better alerted of particular incoming messages. However, one of ordinary skill in the art in light of disclosure can envision the functionality described herein may be applied to other types of modes besides the silent and/or vibrate modes. For instance, the claimed invention may be applied to override a ringtone mode of a device 100 set at a particular volume level to change the particular ringtone to another ringtone and/or to change the volume level (e.g., increase the volume level) to a more appropriate level in order to better alert the user of the device 100. Thus, the claimed invention should not be construed to be limited to only overriding the silent and/or vibrate modes on a mobile device 100.

That which is disclosed and claimed:

1. An apparatus for receiving incoming messages comprising:
   one or more components configured to, in response to receiving an incoming message:
   (a) determine whether an override flag has been set for a message source that has sent the incoming message;
   (b) determine whether the incoming message has been received within a window comprising a start period of time and an end period of time;
   (c) determine whether the apparatus is currently in a particular alert mode, the particular alert mode used to alert a user of the apparatus of one or more incoming messages received from one or more types of message sources; and
   (d) in response to: (1) the override flag being set for the message source, (2) the incoming message being received within the window, and (3) the apparatus currently being in the particular alert mode, overriding the particular alert mode to a second alert mode in order to facilitate alerting the user of the device of the incoming message.

2. The apparatus of claim 1, wherein the particular alert mode comprises a silent or vibrate mode and the second alert mode comprises a ringtone mode.

3. The apparatus of claim 1, wherein the particular alert mode comprises a ringtone mode at a first particular volume and the second alert mode comprises the ringtone mode at a second particular volume different than the first particular volume.

4. The apparatus of claim 1, wherein the particular alert mode comprises a first ringtone mode at a first particular volume and the second alert mode comprises a second ringtone mode at a second particular volume.

5. The apparatus of claim 1, wherein the incoming message comprises one of a phone call, a text message, or an electronic mail.

6. The apparatus of claim 1, wherein the apparatus comprises a mobile device.

7. The apparatus of claim 1, wherein the message source comprises one of a phone number, an electronic mail address, or a text message address.

8. The apparatus of claim 1, wherein the message source comprises one of a phone number, an electronic mail address, or a text message address associated with a particular contact listed in contract information residing on the apparatus, and the apparatus further comprises one or more components configured to allow the user of the apparatus to set the override flag for the particular contact or for the message source for the particular contact in the contact information.

9. The apparatus of claim 8, wherein the apparatus further comprises one or more components configured to allow the user of the apparatus to set the window for the particular contact or for the message source for the particular contact in the contact information.

10. The apparatus of claim 9, wherein a recurrence designation can be set for an application of the window, the recurrence designation comprising once, one or more particular days, weekly on one or more particular days, and at all times.

11. A non-transitory computer-readable medium containing executable code for overriding an alert mode on an apparatus, that when executed by at least one processor of the apparatus causes the at least one processor to, in response to receiving an incoming message:
   (a) determine whether an override flag has been set for a message source that has sent the incoming message;
   (b) determine whether the incoming message has been received within a window comprising a start period of time and an end period of time;
   (c) determine whether the apparatus is currently in a particular alert mode, the particular alert mode used to alert a user of the apparatus of one or more incoming messages received from one or more types of message sources; and
   (d) in response to: (1) the override flag being set for the message source, (2) the incoming message being received within the window, and (3) the apparatus currently being in the particular alert mode, overriding the particular alert mode to a second alert mode in order to facilitate alerting the user of the device of the incoming message.

12. The non-transitory computer-readable medium of claim 11, wherein the particular alert mode comprises a silent or vibrate mode and the second alert mode comprises a ringtone mode.

13. The non-transitory computer-readable medium of claim 11, wherein the particular alert mode comprises a ringtone mode at a first particular volume and the second alert mode comprises the ringtone mode at a second particular volume different than the first particular volume.

14. The non-transitory computer-readable medium of claim 11, wherein the particular alert mode comprises a first ringtone mode at a first particular volume and the second alert mode comprises a second ringtone mode at a second particular volume.

15. The non-transitory computer-readable medium of claim 11, wherein the incoming message comprises one of a phone call, a text message, or an electronic mail.

16. The non-transitory computer-readable medium of claim 11, wherein the apparatus comprises a mobile device.

17. The non-transitory computer-readable medium of claim 11, wherein the message source comprises one of a phone number, an electronic mail address, or text message address.

18. The non-transitory computer-readable medium of claim 11, wherein the message source comprises one of a phone number, an electronic mail address, or a text message address associated with a particular contact listed in contract information residing on the apparatus, and wherein when the executable code is executed by the at least one processor of the apparatus causes the at least one processor to allow the user of the apparatus to set the override flag for the particular contact or for the message source for the particular contact in the contact information.

19. The non-transitory computer-readable medium of claim 18, wherein when the executable code is executed by the at least one processor of the apparatus causes the at least one processor to allow the user of the apparatus to set the window for the particular contact or for the message source for the particular contact in the contact information.

20. The non-transitory computer-readable medium of claim 19, wherein a recurrence designation can be set for an application of the window, the recurrence designation comprising once, one or more particular days, weekly on one or more particular days, and at all times.

21. A method for overriding an alert mode on an apparatus, the method comprising the step of:
   providing executable code that can be installed on the apparatus, wherein when the executable code is executed by at least one processor of the apparatus causes the at least one processor to:
   (a) determine whether an override flag has been set for a message source that has sent the incoming message;
   (b) determine whether the incoming message has been received within a window comprising a start period of time and an end period of time;
   (c) determine whether the apparatus is currently in a particular alert mode, the particular alert mode used to alert a user of the apparatus of one or more incoming messages received from one or more types of message sources; and
   (d) in response to: (1) the override flag being set for the message source, (2) the incoming message being received within the window, and (3) the apparatus currently being in the particular alert mode, overriding the particular alert mode to a second alert mode in order to facilitate alerting the user of the device of the incoming message.

22. The method of claim 21, wherein the particular alert mode comprises a silent or vibrate mode and the second alert mode comprises a ringtone mode.

23. The method of claim 21, wherein the incoming message comprises one of a phone call, a text message, or an electronic mail.

24. The method of claim 21, wherein the apparatus comprises a mobile device.

25. The method of claim 21, wherein the message source comprises one of a phone number, an electronic mail address, or a text message address.

26. The method of claim 21, wherein the message source comprises one of a phone number, an electronic mail address, or a text message address associated with a particular contact listed in contract information residing on the apparatus, and wherein when the executable code is executed by the at least one processor of the apparatus causes the at least one processor to allow the user of the apparatus to set the override flag for the particular contact or for the message source for the particular contact in the contact information.

27. The method of claim 26, wherein when the executable code is executed by the at least one processor of the apparatus causes the at least one processor to allow the user of the apparatus to set the window for the particular contact or for the message source for the particular contact in the contact information.

* * * * *